(12) United States Patent
Reynolds et al.

(10) Patent No.: US 7,234,741 B1
(45) Date of Patent: Jun. 26, 2007

(54) VEHICLE BUMPER ASSEMBLY

(75) Inventors: Mark Reynolds, Madison Heights, MI (US); Jeffery Tessmer, Berkley, MI (US); Richard Eschebach, GrossePointe Shores, MI (US); Ronald Zak, Rochester Hills, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 0 days.

(21) Appl. No.: 11/368,998

(22) Filed: Mar. 7, 2006

(51) Int. Cl.
 *B60R 19/34* (2006.01)
(52) U.S. Cl. ............................. 293/117; 293/132
(58) Field of Classification Search ........... 293/117, 293/132, 133
See application file for complete search history.

(56) References Cited

U.S. PATENT DOCUMENTS

| | | | | |
|---|---|---|---|---|
| 4,831,503 A | * | 5/1989 | DeSantis et al. | 362/497 |
| 5,380,209 A | * | 1/1995 | Converse et al. | 439/35 |
| 5,573,299 A | * | 11/1996 | Masuda | 296/193.09 |
| 6,419,289 B1 | * | 7/2002 | Batten et al. | 293/117 |
| 6,433,748 B1 | | 8/2002 | Ekelund | |
| 6,581,955 B2 | * | 6/2003 | Aquinto et al. | 280/500 |
| 6,686,888 B1 | | 2/2004 | Wendt et al. | |
| 6,729,681 B2 | * | 5/2004 | Yustick | 296/193.01 |
| 2004/0178645 A1 | * | 9/2004 | Minami et al. | 293/121 |

FOREIGN PATENT DOCUMENTS

| | | | | | |
|---|---|---|---|---|---|
| DE | 41 16 232 A1 | | 11/1992 | | |
| JP | 59014544 A | * | 1/1984 | | 293/102 |
| JP | 03061141 A | * | 3/1991 | | 307/10.1 |
| JP | 06144295 A | * | 5/1994 | | |
| JP | 2000289547 A | * | 10/2000 | | |
| JP | 2001151046 A | * | 6/2001 | | |
| JP | 2004276692 A | * | 10/2004 | | |
| JP | 2004278682 A | * | 10/2004 | | |
| JP | 2004282860 A | * | 10/2004 | | |
| JP | 2004357456 A | * | 12/2004 | | |
| KR | 97039428 A | * | 7/1997 | | |

* cited by examiner

*Primary Examiner*—D. Glenn Dayoan
*Assistant Examiner*—Paul Chenevert
(74) *Attorney, Agent, or Firm*—Global IP Counselors, LLP

(57) ABSTRACT

A vehicle bumper assembly includes an elongated energy absorbing member, a plurality of mounting members, a wiring harness and a bumper fascia. The elongated energy absorbing member is dimensioned to extend between first and second sides of a vehicle. The energy absorbing member has an inboard facing surface, an outboard facing surface and an upper surface disposed between the inboard and outboard facing surfaces. The mounting members are longitudinally spaced along the upper surface of the energy absorbing member, each of the mounting members having a wire attachment structure. The wiring harness is coupled to the wire attachment structures of the mounting members such that the wiring harness is supported longitudinally above the upper surface of the energy absorbing member at the mounting members. The bumper fascia fits over the energy absorbing member thereby concealing the wiring harness.

18 Claims, 7 Drawing Sheets

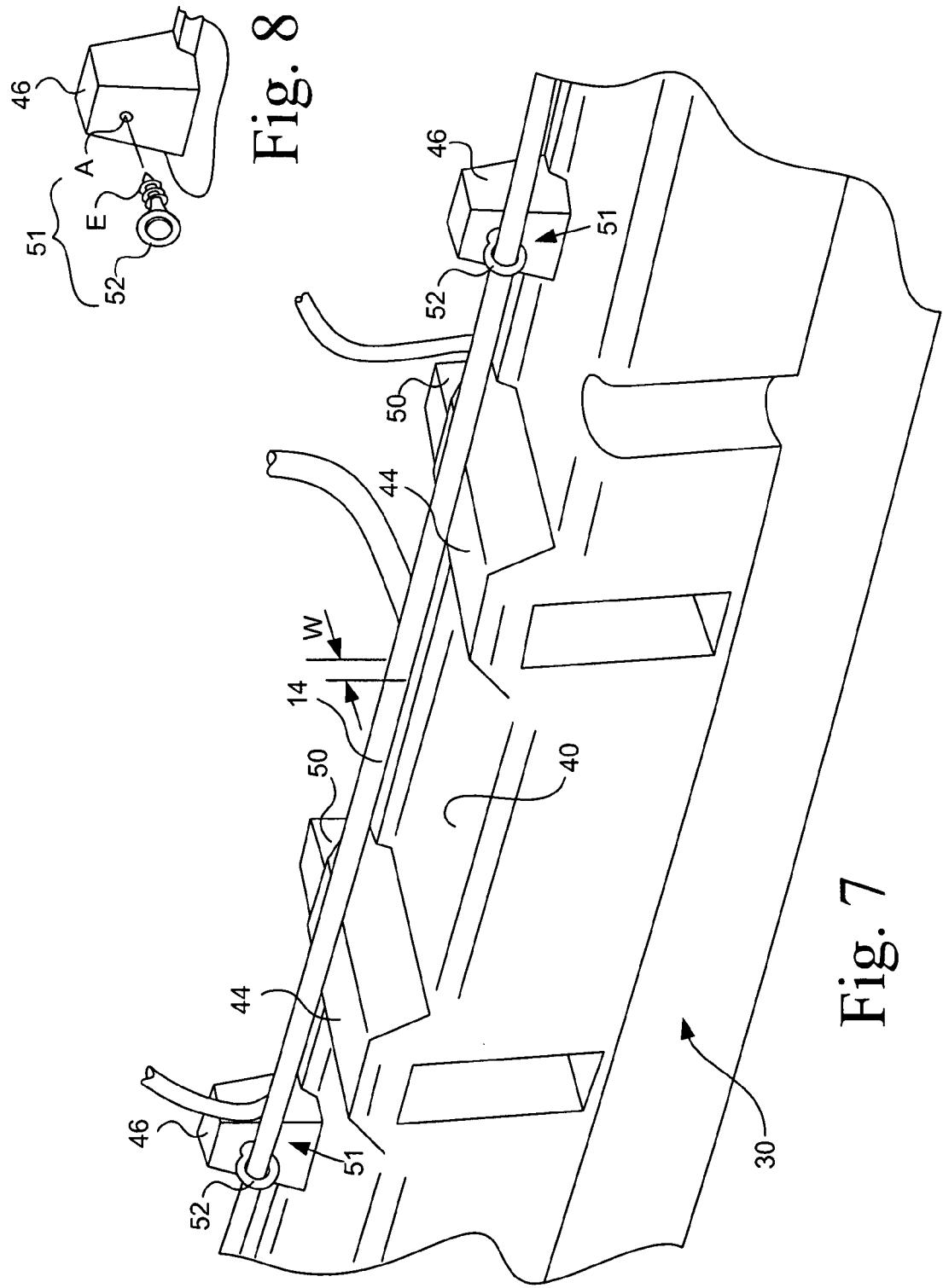

VEHICLE BUMPER ASSEMBLY

BACKGROUND OF THE INVENTION

1. Field of the Invention

The present invention generally relates to a vehicle bumper assembly. More specifically, the present invention relates to a vehicle bumper assembly that includes a wiring harness attachment structure.

2. Background Information

Various components and assemblies of motor vehicles are routinely being redesigned in order to improve functionality. One such assembly undergoing redesign is the vehicle bumper assembly of passenger vehicles. Years ago, a vehicle bumper assembly typically included monolithic chrome plated metallic member that was bolted to either the front or rear end of the vehicle. In more recent years such bumper assemblies have been redesigned to include an energy absorbing inner member and an outer fascia member that covers and conceals the energy absorbing inner member. The energy absorbing inner member is typically a resilient member that absorbs energy upon vehicular impact. The fascia member in such vehicle bumper assembly designs is typically a flexible member that has shapes and contours that compliment the aesthetics of the vehicle. In some vehicle bumper assembly designs there are spaces between the fascia member and the energy absorbing inner member that are not utilized.

In view of the above, it will be apparent to those skilled in the art from this disclosure that there exists a need for an improved vehicle bumper assembly that makes use of the spaces between the energy absorbing inner member and the fascia member. This invention addresses this need in the art as well as other needs, which will become apparent to those skilled in the art from this disclosure.

SUMMARY OF THE INVENTION

It has been discovered that in order to increase the functionality of a vehicle bumper assembly, a wiring harness can be positioned in the spaces between an energy absorbing inner member and an outer fascia member of the vehicle bumper assembly.

One object of the present invention is to provide a vehicle bumper assembly that increases the functionality of the bumper.

Another object of the present invention is to provide a vehicle bumper assembly with structure that secures a wiring harness within the energy absorbing inner member.

Yet another object of the present invention is to conceal a wiring harness within a vehicle bumper assembly.

In one aspect of the present invention, a vehicle bumper assembly includes an elongated energy absorbing member, a plurality of mounting members and a wiring harness. The elongated energy absorbing member is dimensioned to extend between first and second sides of a vehicle. The energy absorbing member has an inboard facing surface, an outboard facing surface and an upper surface disposed between the inboard and outboard facing surfaces. The mounting members are longitudinally spaced along the upper surface of the energy absorbing member. Each of the mounting members includes a wire attachment structure. The wiring harness is coupled to the wire attachment structures of the mounting members such that the wiring harness is supported longitudinally above the upper surface of the energy absorbing member at the mounting members.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a rear perspective view of the energy absorbing member showing the wiring harness attached to the mounting members by the attachment clips in accordance with the present invention; and FIG. 8 is a fragmentary exploded perspective view showing one of the mounting members and one of the attachment clips in accordance with the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
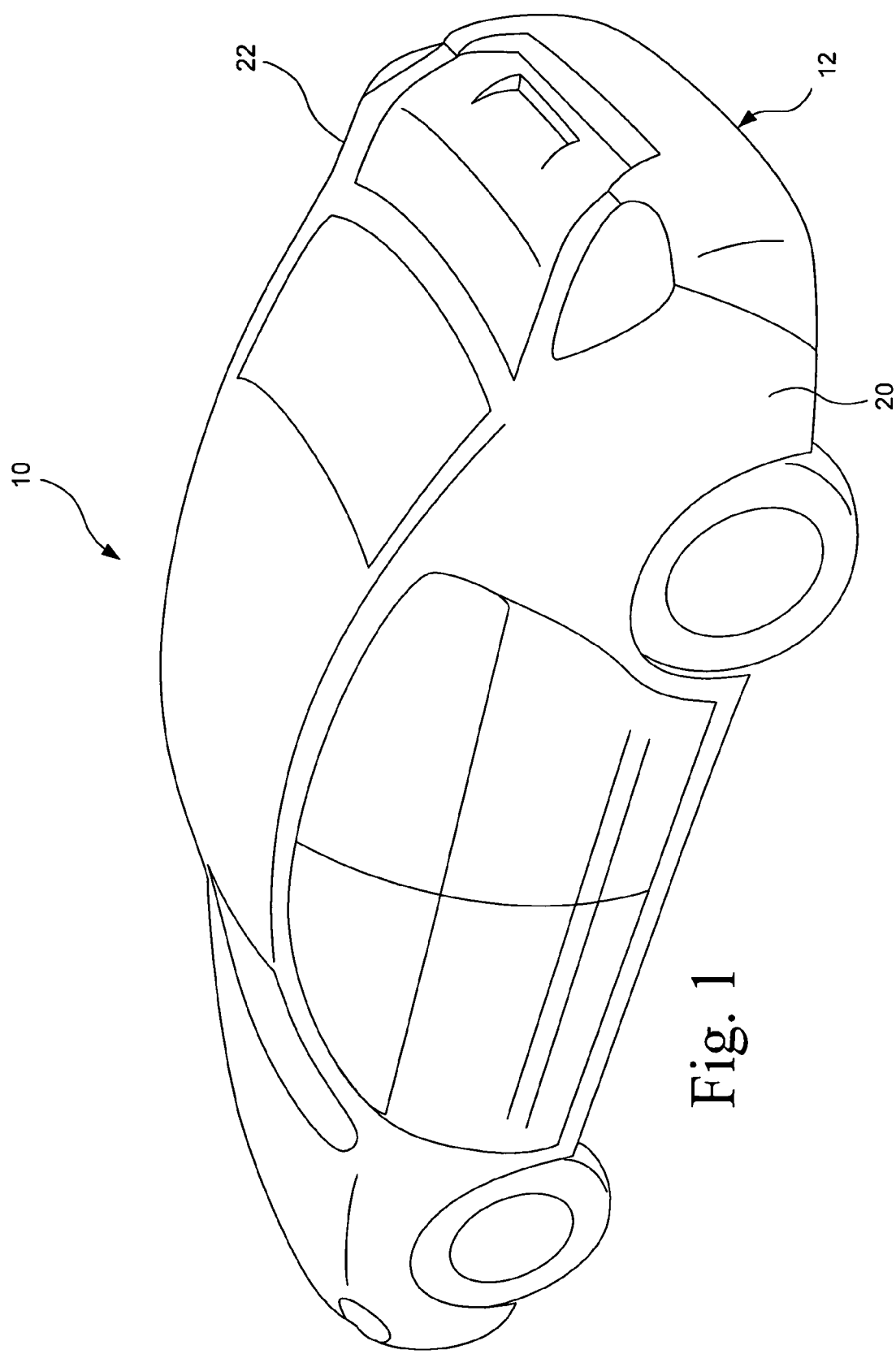
FIG. 1 is a perspective view of a vehicle that includes a vehicle bumper assembly in accordance with the present invention.
Figure 2:
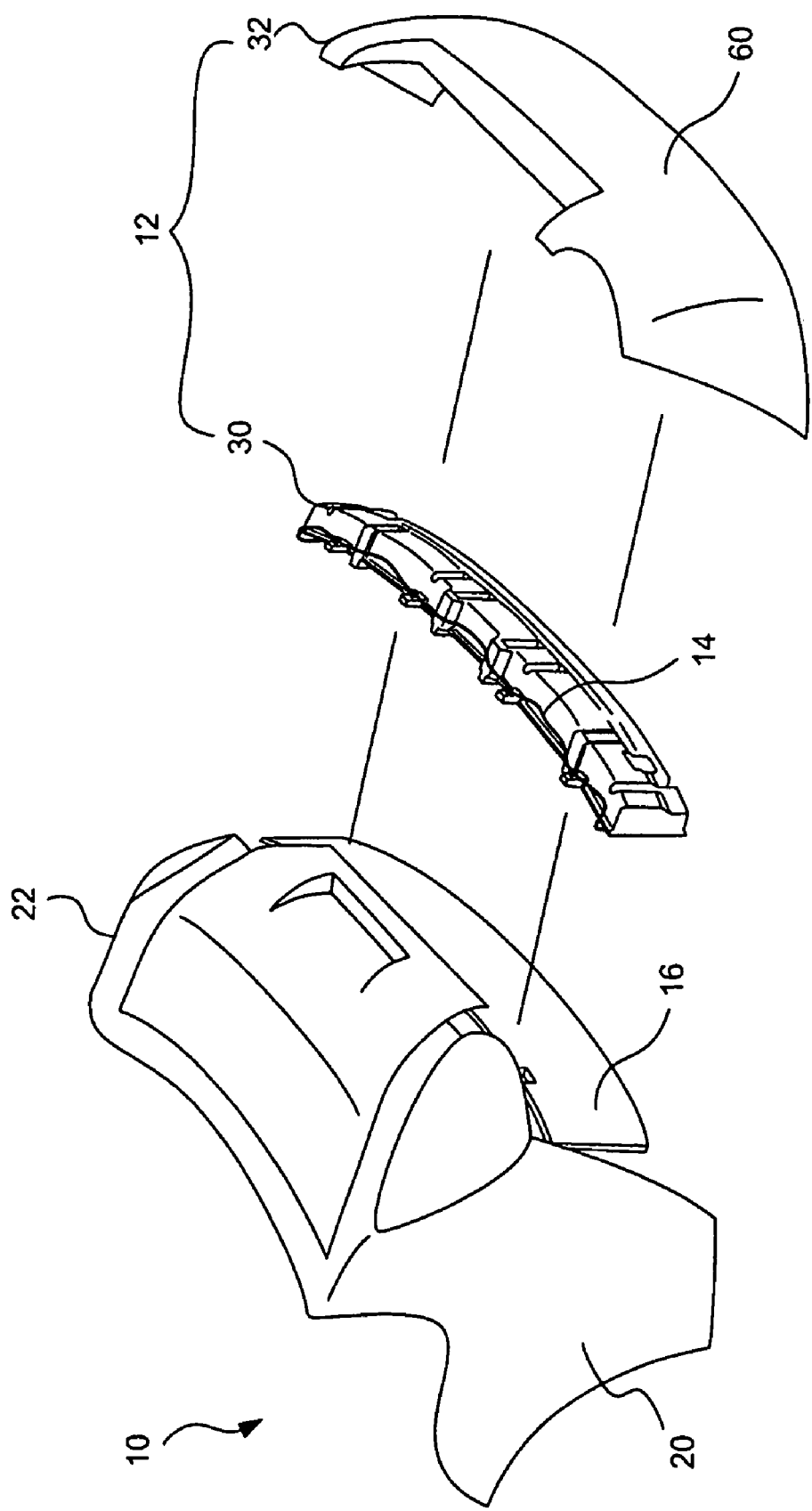
FIG. 2 is an exploded perspective view of the rear portion of the vehicle showing portions of the vehicle bumper assembly in accordance with the present invention.

Referring initially to FIGS. 1 and 2, a vehicle 10 is illustrated that is equipped with a vehicle body assembly in accordance with one preferred embodiment of the present invention. As explained below, the vehicle body assembly includes a vehicle bumper assembly 12 with a concealed a wiring harness 14 and a vehicle bumper support member 16 that supports the vehicle bumper assembly 12. The vehicle bumper assembly 12 can be either a front body assembly or a rear bumper assembly. However, for the sake of brevity, only a rear bumper assembly will be illustrated.

Figure 3:
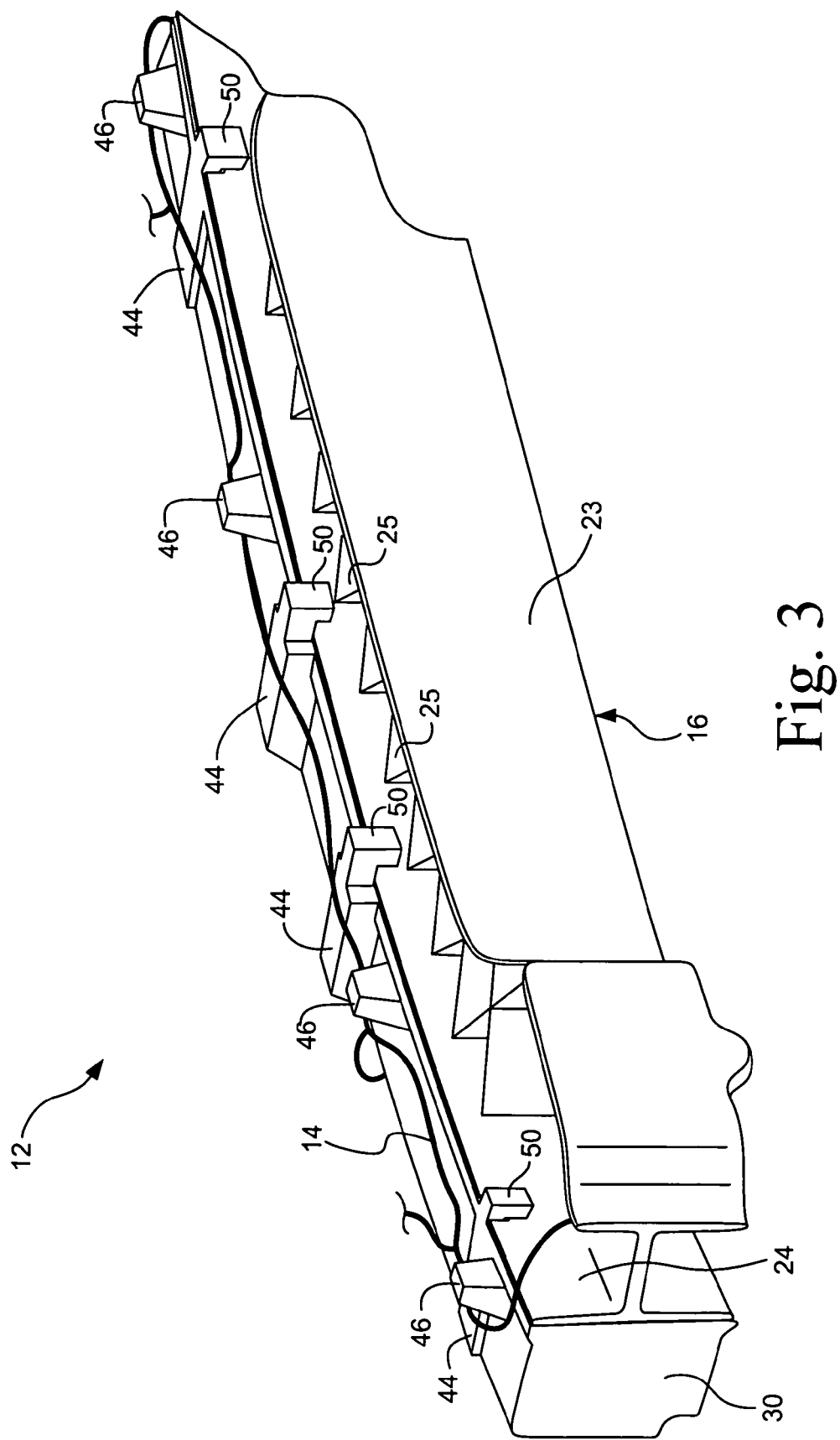
FIG. 3 is a perspective view of portions of the vehicle bumper assembly showing a support member of the vehicle, an energy absorbing member and a wiring harness of the vehicle bumper assembly in accordance with the present invention.
Figure 4:
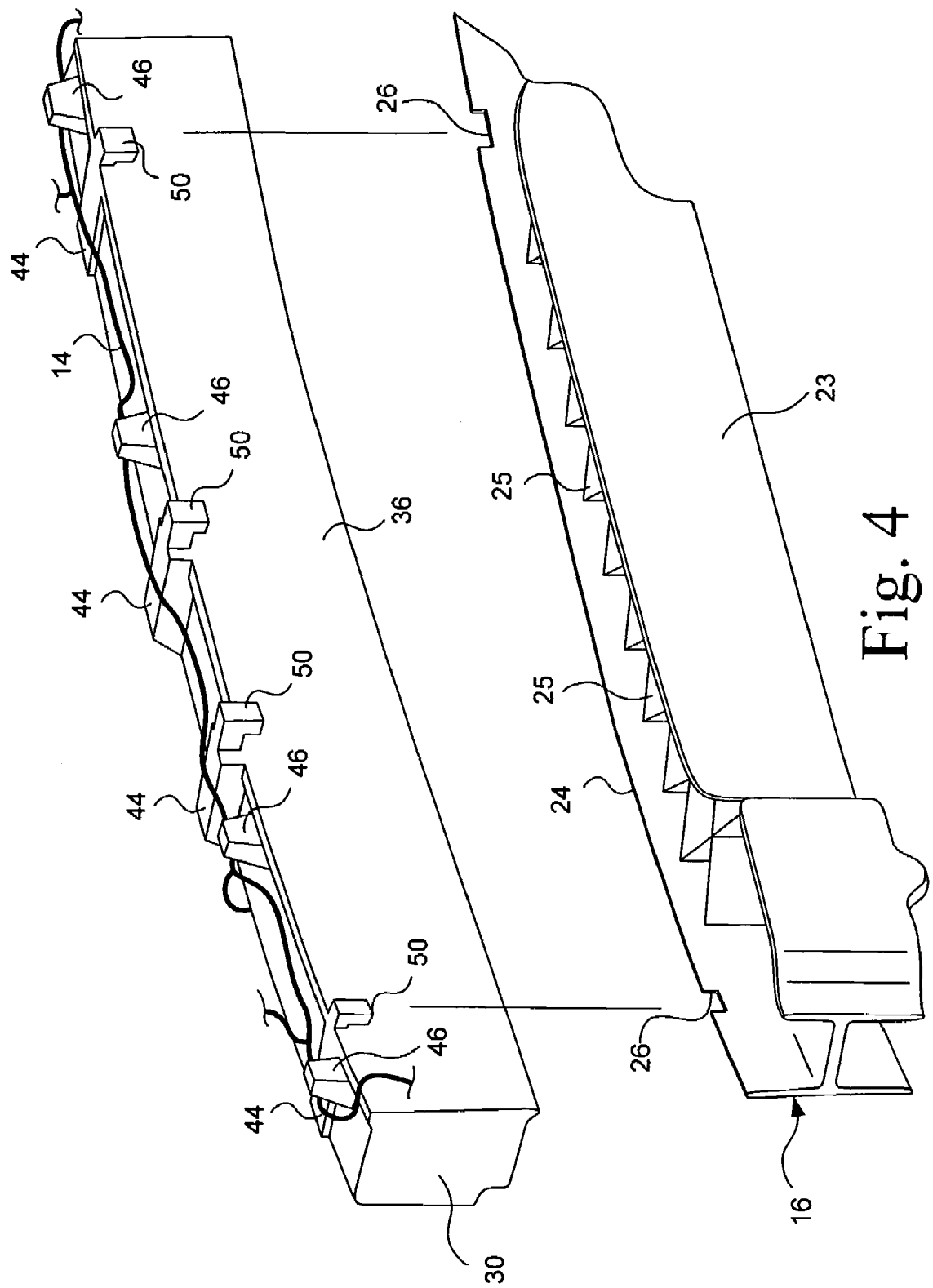
FIG. 4 is an exploded rear perspective view of portions of the vehicle bumper assembly showing the support member of the vehicle and the energy absorbing member of the vehicle bumper assembly separated from one another along with the wiring harness in accordance with the present invention.

As shown in FIGS. 2, 3 and 4, the vehicle bumper support member 16 is supported in a conventional manner to the vehicle 10, which includes various structural elements and components that are part of the vehicle body assembly. The vehicle 10 includes a first side 20 and a second side 22 with the vehicle bumper support member 16 extending therebetween. The vehicle bumper support member 16 is preferably made of a metal or other similar rigid material and has any of variety of structural features. For instance, the vehicle bumper support 16 basically includes a forward portion 23, a rearward portion 24 and a plurality of reinforcement flanges 25 extending therebetween. The vehicle bumper support member 16 has an arcuate contour or shaped. The rearward portion 24 includes a plurality of hook receiving portions 26, as shown in FIG. 4.

Figure 5:
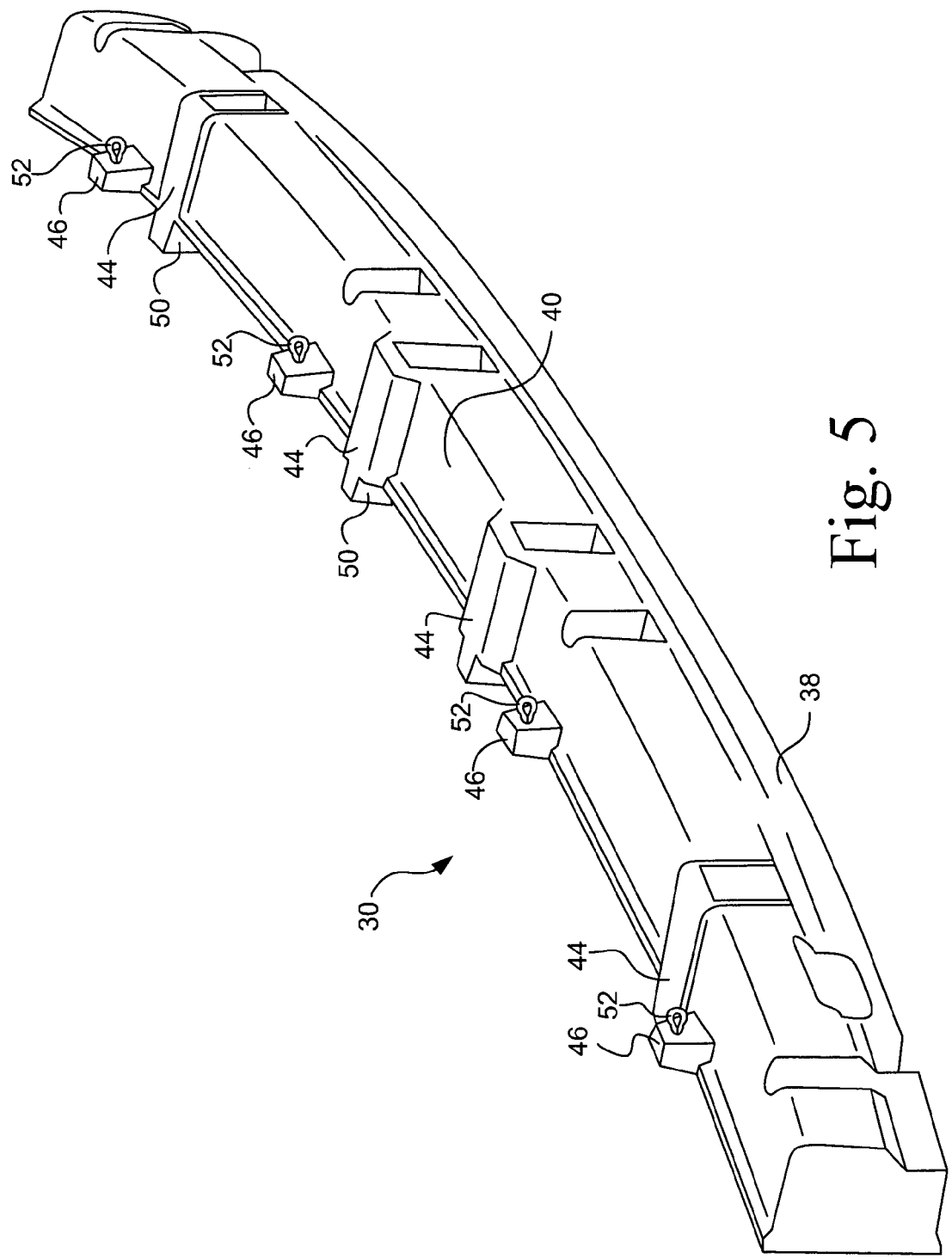
FIG. 5 is a front perspective view of the energy absorbing member of the vehicle bumper assembly with the wiring harness removed to show a plurality of mounting members and attachment clips in accordance with the present invention.

With specific reference to FIGS. 2, 3, 4 and 5, the vehicle bumper assembly 12 is now described in greater detail. The vehicle bumper assembly 12 further includes an elongated energy absorbing member 30 and a bumper fascia 32. The elongated energy absorbing member 30 is dimensioned to extend approximately between the first and second sides 20 and 22 of the vehicle 10, with sufficient space at either end to fit within the bumper fascia 32. As best shown in FIG. 4, the elongated energy absorbing member 30 further includes an inboard facing surface 36. As best shown in FIG. 5, the elongated energy absorbing member 30 also includes an outboard facing surface 38 and an upper surface 40 that extends between the inboard and outboard facing surfaces 36 and 38.

The upper surface 40 of the elongated energy absorbing member 30 includes a plurality of projections 44 and a plurality of mounting members 46. The plurality of projections 44 extend generally perpendicular to the inboard and outboard facing surfaces along the upper surface 40 of the energy absorbing member 30.

Figure 6:
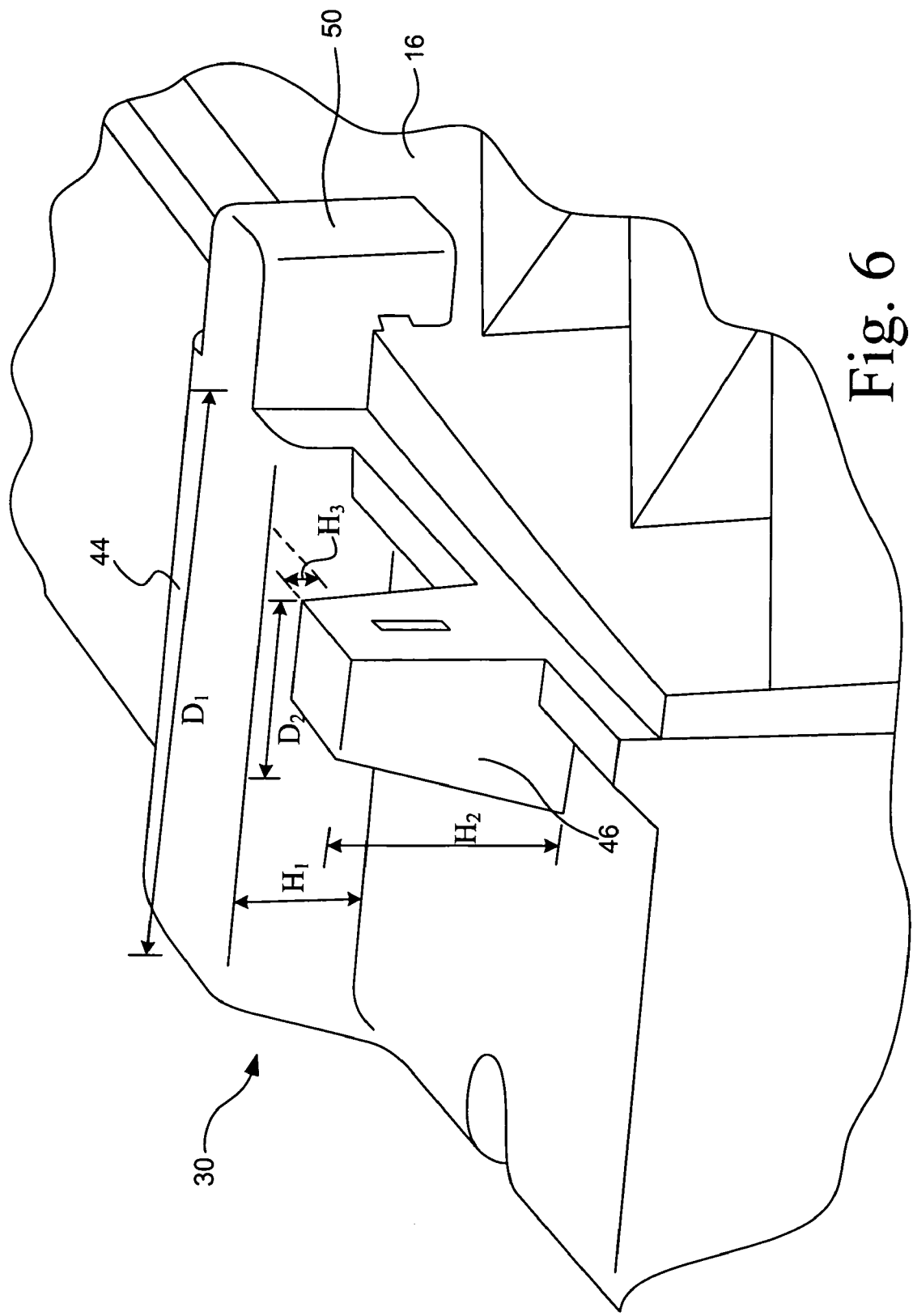
FIG. 6 is a fragmentary perspective view of a portion of the energy absorbing member with the wiring harness removed to show one of the attachment hooks and one of the mounting member of the vehicle bumper assembly in accordance with the present invention.

As shown in FIG. 6, the projections 44 extend along the upper surface 40 a first distance $D_1$. The projections 44 are formed with a height $H_1$. Each of the projections 44 includes a connecting hook 50 (FIGS. 4 and 6) that is located at the inboard facing surface 36. The connecting hooks 50 further extend forward over the inboard facing surface 36, as shown in FIG. 4. Each of the connecting hooks 50 has a downwardly extending free end that projects downward to form a hook shape. The connecting hook 50 is configured to mount the energy absorbing member 30 to the vehicle bumper support member 16. Two of the connecting hooks 50 engage and fit into the hook receiving portions 26 of the rearward portion 24 of the vehicle bumper support member 16. The remaining connecting hooks 50 extend over an upper edge of the rearward portion 24 of the vehicle bumper support member 16 to hold the energy absorbing member 30 in position.

With specific reference to FIGS. 6 and 7, a description of the mounting members 46 of the energy absorbing member 30 will now provided. The mounting members 46 are spaced apart from one another along the upper surface 40 of the energy absorbing member 30 as shown in FIG. 7. Preferably, the mounting members 46 are positioned adjacent to one of the projections 44. However it should be understood that the exact positioning of the mounting members 46 with respect to the projections 44 is an engineering consideration depending upon the specific vehicle on which the bumper assembly 12 of the present invention will be installed. Therefore, the spacing depicted in the Figures is not a fixed spacing, but rather is merely one example or embodiment of the present invention. Further, although four mounting members 46 are depicted, the number required to retain the wiring harness 14 is also an engineering consideration dependent upon design criteria of the vehicle and the specific wiring demands of the wiring harness 14.

The mounting members 46 extend along the upper surface a second distance $D_2$ that is less than the first distance $D_1$. The mounting members 46 are formed with a height $H_2$. The height $H_2$ preferably greater than height $H_1$ by a height or distance $H_3$. The heights $H_1$ and heights $H_2$ are measured with respect to the vertical from the upper surface 40 of the energy absorbing member 30.

As best shown in FIGS. 7 and 8, each of the mounting members 46 includes a wire attachment structure 51. The mounting members 46 extend above the upper surface 40 of the energy absorbing member 30 to upper free ends that are located at a level that is above the projections 44 by the distance $H_3$ that is at least equal to a transverse width W (shown in FIG. 7) of the wiring harness 14. The wiring harness 14 is coupled to the wiring harness attachment structures 51 of the mounting members 46 such that the wiring harness 14 is supported longitudinally above the upper surface 40 of the energy absorbing member 30.

Each of the wire attachment structures 51 includes a clip 52 that is configured and arranged to secure the wiring harness 14 to the mounting members 46. The clips 52 can be any of variety of configuration such as a ring encircling the wiring harness 14. Alternatively, the clips 52 can be replaced with a plastic tie or a conventional snap and lock clamp member typically used for fixing wiring harness in place within vehicle. The clips 52 can also be replaced with a metallic wire material wrapped around the wiring harness 14 thereby securing it in position. As shown in FIG. 8, each of the clips 52 is formed with a friction fit attachment end E that fits into a corresponding aperture A in the mounting member 46. The attachment end E can include a plurality of friction flaps that compress when inserted into the aperture A.

As shown in FIGS. 4 and 6, each of the mounting members 46 is located adjacent to the inboard facing surface 36 of the energy absorbing member 30. Each of the mounting members 46 includes or is in the form of protrusion that extends from the energy absorbing member 30. The mounting members 46, the projections 44 and the remainder of the energy absorbing member 30 are preferably formed integrally as a single one piece, unitary element.

With specific reference to FIG. 2, the bumper fascia 32 will now describe in greater detail. The bumper fascia 32 in configured to cover the energy absorbing member 30 and conceal the wiring harness 14. The bumper fascia 32 covers the energy absorbing member 30 with an outermost portion 60 of the bumper fascia 32 being proximate the energy absorbing member 30. The bumper fascia 32 is attached to the vehicle 10 and/or the bumper support member 16 by any of variety of conventional configuration such as fasteners. The bumper fascia 32 is preferably made of a plastic, composite material or polymer material that is flexible and resilient.

The wiring harness 14 is a conventional component of the vehicle 10 and includes various wires that provide power to, for example, rear tail lights, brake lights and/or a trunk lock. The specific purposes of the wiring harness 14 depend upon the various features of the vehicle 10. By retaining and concealing the wiring harness 14 within the bumper assembly 12, interior portions of the vehicle 10 can be utilized for purposes other than retaining the wiring harness 14.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle bumper assembly comprising:
   an elongated energy absorbing member dimensioned to extend between first and second sides of a vehicle, the energy absorbing member having an inboard facing surface, an outboard facing surface and an upper surface disposed between the inboard and outboard facing surfaces;
   a plurality of mounting members longitudinally spaced along the upper surface of the energy absorbing member, each of the mounting members having a wire attachment structure; and
   a wiring harness coupled to the wire attachment structures of the mounting members such that the wiring harness is supported longitudinally above the upper surface of the energy absorbing member at the mounting members,
   the energy absorbing member including a plurality of projections extending generally perpendicular to the inboard and outboard facing surfaces along the upper surface of the energy absorbing member,
   the mounting members extending above the upper surface of the energy absorbing member to upper free ends that are located at a level that is above the projections by a distance that is at least equal to a transverse width of the wiring harness.

2. A vehicle body assembly comprising:
   a vehicle bumper support member;
   an energy absorbing member having an inboard facing surface an outboard facing surface and an upper surface disposed between the inboard and outboard facing surfaces with the vehicle bumper support member coupled at the inboard facing surface side of the energy absorbing member;
   a plurality of mounting members disposed adjacent the inboard facing surface of the energy absorbing member;
   a bumper fascia covering the energy absorbing member with an outermost portion of the bumper fascia proximate the energy absorbing member; and
   a wiring harness coupled to the mounting members such that the wiring harness is supported longitudinally above the upper surface of the energy absorbing member at the mounting members,
   the energy absorbing member including a plurality of projections extending generally perpendicular to the inboard and outboard facing surfaces along the upper surface of the energy absorbing member,
   the mounting members extending above the upper surface of the energy absorbing member to upper free ends that are located at a level that is above the projections by a distance that is at least equal to a transverse width of the wiring harness.

3. A vehicle bumper assembly comprising:
   an elongated energy absorbing member dimensioned to extend between first and second sides of a vehicle, the energy absorbing member having an inboard facing surface, an outboard facing surface and an upper surface disposed between the inboard and outboard facing surfaces;
   a plurality of mounting members longitudinally spaced along the upper surface of the energy absorbing member and extending upwardly from the upper surface of the energy absorbing member, each of the mounting members having a wire attachment structure with a wiring harness fastener;
   a wiring harness coupled to the wiring harness fasteners of the wire attachment structures of the mounting members to be secured to the mounting members such that the wiring harness is supported at a distance spaced longitudinally above the upper surface of the energy absorbing member at the mounting members; and
   a bumper fascia covering the energy absorbing member and concealing the wiring harness.

4. The vehicle bumper assembly as set forth in claim 3, wherein
   the wiring harness fastener of each of the wire attachment structures includes a clip configured to secure the wiring harness to the mounting members.

5. The vehicle bumper assembly as set forth in claim 3, wherein
the energy absorbing member includes a plurality of connecting hooks located at the inboard facing surface to mount the energy absorbing member to a vehicle bumper support member.

6. The vehicle bumper assembly as set forth in claim 3, wherein
each of the mounting members is located adjacent the inboard facing surface.

7. The vehicle bumper assembly as set forth in claim 3, wherein
each of the mounting members includes a protrusion portion that is integrally formed as a one-piece, unitary element with the energy absorbing member.

8. The vehicle bumper assembly as set forth in claim 7, wherein
the wiring harness fastener of each of the wire attachment structure includes a clip secured to a corresponding one of the protrusion portions.

9. The vehicle bumper assembly as set forth in claim 3, wherein
the energy absorbing member includes a plurality of projections extending generally perpendicular to the inboard and outboard facing surfaces along the upper surface of the energy absorbing member.

10. The vehicle bumper assembly as set forth in claim 9, wherein
the projections extend along the upper surface a first longitudinal distance and the mounting members extend along the upper surface a second longitudinal distance that is less than the first longitudinal distance.

11. The vehicle bumper assembly as set forth in claim 9, wherein
each of the projections includes a connecting hook located at the inboard facing surface to mount the energy absorbing member to a vehicle bumper support member.

12. A vehicle body assembly comprising:
a vehicle bumper support member;
an energy absorbing member having an inboard facing surface, an outboard facing surface and an upper surface disposed between the inboard and outboard facing surfaces with the vehicle bumper support member coupled at the inboard facing surface side of the energy absorbing member;
a plurality of mounting members disposed adjacent the inboard facing surface of the energy absorbing member and extending upwardly from the upper surface of the energy absorbing member, each of the mounting members including a wiring harness fastener;
a wiring harness coupled to the wiring harness fasteners of the mounting members to be secured to the mounting members such that the wiring harness is supported at a distance spaced longitudinally above the upper surface of the energy absorbing member at the mounting members; and
a bumper fascia covering the energy absorbing member and concealing the wiring harness with an outermost portion of the bumper fascia proximate the energy absorbing member.

13. The vehicle body assembly as set forth in claim 12, wherein
the wiring harness fastener of each of the mounting members includes a clip configured to secure the wiring harness to the mounting members.

14. The vehicle body assembly as set forth in claim 12, wherein
the energy absorbing member includes a plurality of hooks located at the inboard facing surface to mount the energy absorbing member to the vehicle bumper support member.

15. The vehicle body assembly as set forth in claim 12, wherein
the energy absorbing member and the mounting members are formed integrally as a one-piece, unitary element.

16. The vehicle body assembly as set forth in claim 12, wherein
the energy absorbing member includes a plurality of projections extending generally perpendicular to the inboard and outboard facing surfaces along the upper surface of the energy absorbing member.

17. The vehicle body assembly as set forth in claim 16, wherein
the projections extend along the upper surface a first longitudinal distance and the mounting members extend along the upper surface a second longitudinal distance that is less than the first longitudinal distance.

18. The vehicle body assembly as set forth in claim 16, wherein
the energy absorbing member, the projections and the mounting members are formed integrally as a one-piece, unitary element.

* * * * *